United States Patent [19]

Zecher et al.

[11] Patent Number: 4,546,162

[45] Date of Patent: Oct. 8, 1985

[54] POLYAMIDOIMIDES PREPARED FROM TRIMELITIC ACID ANHYDRIDE, ISOCYANATES AND EITHER LACTAMS OR POLYAMIDES USING A MIXTURE OF DIISOCYANATODIPHENYLMETHANE AND TOLYLENE DIISOCYANATES

[75] Inventors: Wilfried Zecher; Willi Dünwald; Rudolf Merten, all of Leverkusen; Klaus Reinking, Wermelskirchen, all of Fed. Rep. of Germany

[73] Assignee: Bayer Aktiengesellschaft, Leverkusen, Fed. Rep. of Germany

[21] Appl. No.: 644,706

[22] Filed: Aug. 27, 1984

[30] Foreign Application Priority Data

Sep. 6, 1983 [DE] Fed. Rep. of Germany ....... 3332032

[51] Int. Cl.[4] ............................................. C08G 20/32

[52] U.S. Cl. .................................... 528/67; 428/375; 428/379; 428/425.8

[58] Field of Search ................. 528/67; 428/375, 379, 428/425.8

[56] References Cited

U.S. PATENT DOCUMENTS

| | | | |
|---|---|---|---|
| 3,658,773 | 4/1972 | Zecher et al. | 528/48 |
| 3,708,458 | 1/1973 | Alberino et al. | 528/67 |
| 3,752,791 | 8/1973 | Zecher et al. | 524/742 |
| 4,448,844 | 5/1984 | Osada et al. | 524/104 |
| 4,472,567 | 9/1984 | Zecher et al. | 524/736 |

*Primary Examiner*—Maurice J. Welsh
*Attorney, Agent, or Firm*—Connolly and Hutz

[57] ABSTRACT

This invention relates to certain new aliphatic-aromatic polyamidoimides suitable for use as non-clouding electroinsulating lacquers and duroplasts.

9 Claims, No Drawings

POLYAMIDOIMIDES PREPARED FROM TRIMELITIC ACID ANHYDRIDE, ISOCYANATES AND EITHER LACTAMS OR POLYAMIDES USING A MIXTURE OF DIISOCYANATODIPHENYLMETHANE AND TOLYLENE DIISOCYANATES

This invention relates to certain new aliphatic-aromatic polyamidoimides suitable for use as non-clouding electroinsulating lacquers and duroplasts.

Aliphatic-aromatic polyamidoimides may be obtained, for example, by the reaction of trimellitic acid anhydride with polyisocyanates and lactams or aliphatic polyamides (DBP Nos. 1,770,202 and 1,956,512) and they are used in particular as temperature-resistant electroinsulating lacquers. One disadvantage of these polyamidoimides is that relatively highly concentrated solutions and solvent-free melts of these resins become cloudy at temperatures of from 50° to 200° C., in particular at temperatures of about 150° C., forming jelly-like regions, and these turbidities are difficult to dissolve so that the preparation of relatively highly concentrated resins and the application thereof, for example, as so-called "high solids" is difficult or even impossible.

It has now been found that clear polyamidoimide resins which do not have these disadvantages are obtained if the polyisocyanates used in the reaction of trimellitic acid anhydride, lactams or aliphatic polyamides and polyisocyanates to form polyamidoimides at from 0° to 400° C., preferably from 50° to 350° C., consist of mixtures of from 98 to 40% of 4,4'-diisocyanatodiphenylmethane and from 2 to 60% of 2,4- or 2,6-tolylene diisocyanates or mixtures thereof, preferably from 90 to 50% of 4,4'-diisocyanatodiphenylmethane and from 10 to 50% of tolylene diisocyanates.

The properties of the polyamidoimides according to the present invention must be considered unexpected since tolylene diisocyanates only give rise to brittle lacquer films under the given conditions, while polyamidoimides based on 4,4'-diisocyanatodiphenylmethane in phenolic solutions at the concentrations required in practice of from 50 to 90%, by weight, solids content give rise to in part irreversible cloudiness and jelly-like impurities at temperatures of from 50° to 200° C., in particular about 150° C., which are unavoidable for the technical production of these resins. By contrast, resins and solutions of the present polyisocyanate mixtures remain clear and workable for periods of several hours within the critical ranges of concentration and temperature so that production, even on a technical scale which requires prolonged dwell times, may be achieved quite problem-free and without a noticeable drop in the product properties, for example the elasticity, softening temperature or abrasion resistance in the case of lacquer films.

One further advantage of the polyamidoimide resins obtained from the polyisocyanate mixtures according to the present invention lies in the possibility of the application thereof as high solids and highly concentrated melts, which also require such systems to be stable at elevated temperatures and concentrations.

The acid anhydride used according to the present invention is trimellitic acid anhydride, and the lactams used according to the present invention are those described in DBP No. 1,770,202, preferably compounds corresponding to the following general formula:

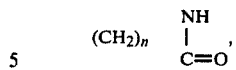

wherein n represents an integer of from 2 to 20; caprolactam being particularly preferred.

The polyamides used for the present process may be obtained by the polycondensation of dicaboxylic acids or dertivatives thereof with diamines or aminocarboxylic acids and derivatives thereof, e.g. lactams, such as those used, for example, in DBP No. 1,956,512.

According to the present invention, there may be used polyamides corresponding to the following general formula (Ia):

$$-[(CH_2)_n-CONH]- \qquad (Ia)$$

wherein
  n represents an integer of from 2 to 20; and
  polyamides corresponding to the following general formula (Ib):

$$-[CO-(CH_2)_x-CONH-(CH_2)_y-NH] \qquad (Ib)$$

wherein
  x represents an integer of from 0 to 18; and
  y represents an integer of from 2 to 18.
Polyamides having the following recurrent structural units are preferred:

$$(-[CH_2]_2-CO-NH-)$$

$$(-[CH_2]_5-CO-NH-)$$

$$(-[CH_2]_{11}-CO-NH-)$$

$$(-CO-[CH_2]_4-CO-NH-[CH_2]_6-NH-)$$

$$(-CO-[CH_2]_8-CO-NH-[CH_2]_6-NH-)$$

Polycapronamide (nylon 6), hexamethylene adipamide (nylon 66) and mixtures of these two types of polyamides are particularly preferred. They may be used singly or as mixtures with caprolactam.

The isocyanates used according to the present invention may be 4,4'-diisocyanatodiphenylmethane and 2,4- and 2,6-tolylenediisocyanate and commercial mixtures thereof, e.g. the mixture of 80% of 2,4- and 20% of 2,6-tolyelene diisocyanate. Instead of using 4,4'-diisocyanatodiphenylmethane alone, a proportion of up to about 40% thereof may be replaced by polyphenyl-polymethylene polyisocyanates obtainable by aniline/-formaldehyde condensation, followed by phosgenation, and instead of 4,4'-diisocyanatodiphenylmethane and the tolylene diisocyanates, a proportion of about 30% thereof may be replaced by the isocyanurates thereof, which may be obtained by trimerisation.

The isocyanates may be used in the free form or they-may be used partially or completely in the form of derivatives thereof which may be obtainable by reaction with compounds containing reactive hydrogen and which function as isocyanate-releasing compounds under the reaction conditions.

The isocyanate-releasing compounds used are preferably acylureas obtainable from lactams, such a caprolactam or pyrrolidone, or carbamic esters obtained from aliphatic or aromatic mono- or poly-hydroxyl compounds.

Suitable examples include the carbamic esters obtained from phenol, isomeric cresols, commercial mixtures thereof and similar aromatic hydroxy compounds, aliphatic monohydric alcohols, such as methanol, butanol, isopropanol, diethylene glycol monomethyl ether, cyclohexanol, benzyl alcohol and aliphatic diols or polyols, such as ethylene glycol and trimethylolpropane.

The masked isocyanates may be used as such or prepared in situ by a reaction, e.g. with lactams, phenols or alcohols.

According to the present invention, trimellitic acid anhydride is used as the anhydride of a polybasic carboxylic acid.

The reaction according to the present invention may be carried out in solvents which are either inert under the reaction conditions or form only loose addition compounds.

The following are suitable solvents: (halogenated) hydrocarbons, phenols, alcohols, esters, lactones, ketones, ethers, nitriles, amides, sulphoxides and sulphones, e.g. xylenes, o-dichlorobenzene, benzoic acid alkyl esters, phthalic acid dimethyl ester, adipic acid dialkyl esters, butyrolactone, caprolactone, acetophenone, cyclohexanone, benzyl alcohol, ethylene glycol, glycol monomethyl ether acetate, diethylene glycol monoethyl ether, diethylene glycol dimethyl ether, benzonitrile, dimethylsulphoxide and mixtures thereof. Hydroxyaromatic compounds, such as phenol, o-, m- and p-cresol, and mixtures thereof have proved to be particularly suitable.

To prepare the polyamidoimides according to the present invention, the reactants, with or without solvent, are maintained at temperatures of from 0° to 400° C., preferably from 50° to 350° C., for several minutes or up to several hours. The progress of the reaction may be followed by the evolution of gas and the IR spectra.

It is sometimes advantageous to carry out the reaction in several stages or to add the individual components in a different sequence or at different temperatures. Thus, for example, an adduct or condensation product may be prepared in a first stage, e.g. in a solvent, and may subsequently be converted at higher temperatures into the high molecular weight reaction product, such as a lacquer film, for example, by a reaction involving chain-lengthening or cross-linking, optionally with evaporation of the solvent. When the reaction product is to be used as lacquer, it may be applied in the form of "high-solids" or solvent-free melt. It is generally advantageous to choose the proportions of the reactants so that the reactive groups are equivalent, although very considerable deviations from these stoichiometric proportions are possible.

The reaction for the preparation of the polyamidoimides according to the present invention may be accelerated by suitable catalysts, e.g. by amines, such as triethylamine, 1,4-diazabicyclo-(2,2,2)-octane, ethyl morpholine, 4-dimethylaminopyridine and pyrrolidino pyridine and 1- or 2-methylimidazole, or inorganic or organic metal compounds, in particular compounds of iron, lead, zinc, tin, copper, cobalt and titanium, such as iron(III) chloride, cobalt acetate, lead oxide, lead acetate, tin octoate, dibutyl tin dilaurate, copper acetylacetonate, titanium tetrabutylate, alkali metal phenolates and sodium cyanide, as well as phosphorus compounds, such as trialkylphosphines and methyl phospholine oxide.

The polyamidoimides according to the present invention are distinguished by the exceptional temperature resistance and high abrasion resistance thereof and are suitable for use as lacquers, foils and moulded products. The properties thereof may be adjusted to different uses by varying the stoichiometric proportions or degree of condensation and by the addition of fillers, pigments and low molecular weight or high molecular weight components.

EXAMPLES

Comparison Example A 113 g of caprolactam, 192 g of trimellitic acid anhydride and 174 g of a mixture of 80 parts of 2,4- and 20 parts of 2,6-tolylene diisocyanate are introduced into 390 g of m-cresol 70 (commercial cresol mixture). The mixture is heated to 200° C. with stirring over a period of 4 hours and maintained at this temperature for 4 hours. 260 g of the solvent are then distilled off under a low vacuum. An approximately 75% melt of the imide resin is obtained; this solidifies to a brittle mass on cooling. A sample of the resin is dissolved in cresol and spread over a glass plate. After stoving for 15 minutes at 200° C. and 15 minutes at 300° C., a brittle lacquer film is obtained, which breaks when attempts are made to remove it from the glass plate.

Comparison Example B 250 g of 4,4'-diisocyanatodiphenylmethane and 192 g of trimellitic acid anhydride are introduced portionwise, with cooling, into a solution of 113 g of caprolactam in 380 g of cresol. The temperature is then raised and the mixture is stirred for 4 hours at 190° C. and 4 hours at 205° C. Condensation takes place with liberation of carbon dioxide. 260 g of the solvent are then distilled off under vacuum. After the reaction product has been poured out, it solidifies on cooling to a brittle resin having a solids content of about 80%, by weight.

Tempering experiments: The 80% imide resin becomes cloudy after 10 minutes at 135° C. and after 80 minutes at 200° C., changing into a solid, difficultly soluble, no longer workable mass.

250 g of the resin prepared as described above are dissolved in 500 g of phenol/cresol (1:1) and applied to a copper wire 0.7 mm in diameter in a vertical oven 4 m in length at an oven temperature of 400° C. until the diameter of the wire has increased by from 40 to 50 $\mu$m. At a lacquering speed of 7 m/min, the maximum external fibre elongation is 88%, the heat shock 260° C., the softening temperature 325° C. (DIN 46 453-10.2) and the scraping tolerance 120 strokes.

Comparison Example C 33.9 g of nylon 6 (polycapronamide) are dissolved in 210 g of cresol. 125 g of 4,4'-diisocyanatodiphenylmethane and 96 g of trimellitic acid anhydride are then introduced. The mixture is heated to 205° C. in the course of 5 hours and then maintained at this temperature for a further 4 hours. 140 g of the solvent are then distilled off. A clear brown resin having a solids content of 75%, by weight, and a viscosity $n^{25}$ of 230 mPas, determined using a 15% solution of the polyamidoimide in cresol, is obtained on cooling.

When the resin is subjected to tempering, it becomes cloudy within 1 hour both at 135° C. and at 200° C. A sample of resin is spread over a test sheet as a 15% solution in cresol and stoved for 15 minutes at 200° C. and 15 minutes at 300° C. to form a clear, elastic lacquer film.

Example 1

113 g of caprolactam, 225 g of 4,4'-diisocyanatodiphenylmethane, 17.4 g of a commercial mixture of 80 parts of 2,4- and 20 parts of 2,6-tolylene diisocyanate and 192 g of trimellitic acid anhydride are stirred in 375 g of phenol/cresol (1:1) for 2 hours at 170° C., 2 hours at 190° C. and 4 hours at 205° C. 260 g of the solvent are then distilled off and the residue is stirred for a further hour at 210° C. On cooling, the polyamidoimide is obtained as a clear brown resin having a solids content of about 80%, by weight. The viscosity $n^{25}$ of a 15% solution in phenol/cresol is 660 mPas.

Tempering experiments: The resin shows a slight cloudiness only after 9.5 hours at 135° C. and is still clear after 25 hours at 200° C.

A 27% solution of the polyamidoimide resin in phenol/cresol (1:1) is applied to a copper wire 0.7 mm in diameter as in Example B. The resulting lacquer wire has a maximum external fibre elongation of 88%, a heat shock of 260° C., a softening temperature of 328° C. and a scraping resistance of 115 strokes.

Example 2

192 g of trimellitic acid anhydride, 124 g of caprolactam, 175 g of 4,4'-diisocyanatodiphenylmethane and 52 g of 2,4-tolylene diisocyanate are introduced into 450 g of cresol and stirred for 2 hours at 170° C., 2 hours at 190° C. and 4 hours at 205° C. 300 g of the solvent are then distilled off under vacuum and the residue is heated for a further hour at 215° C. The clear brown resin obtained on cooling has a solids content of about 75%, by weight. The viscosity $n^{25}$ of a 15% solution in cresol is 600 mPas. The resin remains clear after 20 hours at 135° C. and after 20 hours at 200° C.

A lacquer solution is prepared by dissolving the resin in cresol/phenol (1:1) to a solids content of 25%, by weight. A copper wire 0.7 mm in diameter lacquered as described in Example B at a lacquering speed of 7 m/min has a maximum external fibre elongation of 88%, a heat shock of 260° C., a softening temperature of 330° C. and a scraping tolerance of 87 strokes.

Example 3

33.9 g of nylon 6 (polycapronamide) are dissolved in 200 g of cresol. 17.4 g of a mixture of 80% of 2,4- and 20% of 2,6-tolylene diisocyanate, 100 g of 4,4'-diisocyanatodiphenylmethane and 96 g of trimellitic acid anhydride are then introduced. The temperature is raised to 205° C. in the course of 5 hours with stirring and then maintained for a further 4 hours. 130 g of the solvent are then distilled off. The reaction product solidifies on cooling to a brittle, brown resin having a solids content of about 75%, by weight. The viscosity $n^{25}$ of a 15% solution in cresol is 260 mPas. When the resin is tempered, it remains clear for more than 15 hours, both at 135° C. and at 200° C. A 15% solution of the resin in cresol applied to a test plate forms a clear, elastic lacquer film when stoved for 15 minutes at 200° C. and 15 minutes at 300° C.

Example 4

The introduction of 1017 g of caprolactam into 3150 g of phenol/cresol (1:1) is followed by the introduction, at 120° C., of 1125 g of 4,4'-diisocyanatodiphenylmethane, 783 g of 2,4-tolylene diisocyanate and 1728 g of trimellitic acid anhydride. Condensation is carried out for 4 hours at 190° C. and 4 hours at 205° C. 1860 g of the solvent mixture is distilled off under vacuum and the residue is then stirred for a further hour at 215° C. The polyamidoimide is obtained as a clear brown melt which solidifies on cooling to a brittle resin having a solids content of about 75%, by weight. The viscosity $n^{25}$ of a 15% solution in cresol is 400 mPas. The resin shows no cloudiness after 20 hours at 135° C. and after 20 hours at 200° C.

A 25% solution of the resin in cresol is painted over a glass plate and stoved for 15 minutes at 200° C. and 15 minutes at 300° C. to form a clear, elastic lacquer film.

We claim:

1. Polyamidoimides prepared by the reaction of
   (i) trimellitic acid anhydride,
   (ii) a lactam of the formula

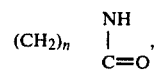

wherein n is an integer of from 2 to 20, a polyamide of the formula $$-[(CH_2)_n-CONH]-$$

wherein
n is an integer of from 2 to 20 or a polyamide of the formula $$-[CO-(CH_2)_x-CONH-(CH_2)_y-NH]$$

wherein
x is an integer of from 0 to 18 and
y is an integer of from 2 to 18, and
   (iii) isocyanates which are mixtures of from 98 to 40%, by weight, of 4,4'-diisocyanatodiphenylmethane and from 2 to 60%, by weight, of tolylene diisocyanates.

2. Polyamidoimides according to claim 1 wherein (ii) is caprolactam.

3. Polyamidoimides according to claim 1 wherein (ii) is a polyamide comprising recurrent structural units of one or more of the formulae $$(-[CH_2]_2-CO-NH-), (-[CH_2]_5-CO-NH-),$$

$$(-[CH_2]_{11}-CO-NH-),$$

$$(-CO-[CH_2]_4-CO-NH-[CH_2]_6-NH-), \text{ or}$$

$$(-CO-[CH_2]_8-CO-NH-[CH_2]_6-NH-).$$

4. Polyamidoimides according to claim 1 wherein (iii) is polycapronamide, hexamethylene adipamide or a mixture thereof.

5. Polyamidoimides according to claim 1 wherein (iii) is 20 to 60% of 2,4- and 2,6-tolylene diisocyanates in a ratio of 4:1.

6. Polyamidoimides according to claim 1 wherein (iii) has up to 40% of the 4,4'-diisocyanatodiphenyl methane replaced with polyphenyl-polymethylene polyisocyanates.

7. Polyamidoimides according to claim 1 wherein (iii) comprises up to 30% of the mixture being in the form of the corresponding isocyanurate.

8. Process for the preparation of polyamidoimides according to claim 1 wherein the reaction components are reacted at a temperature of from 0° to 400° C., with or without a solvent and with or without a catalyst.

9. Coating or duroplast compositions containing a polyamidoimide according to claim 1.

* * * * *